United States Patent [19]
Stevens

[11] 3,987,272
[45] Oct. 19, 1976

[54] MANUFACTURE OF FORKS FOR FORK LIFT TRUCKS

[75] Inventor: Godfrey Alfred Stevens, Leighton Buzzard, England

[73] Assignee: Lancer Boss Limited, Leighton Buzzard, England

[22] Filed: June 24, 1974

[21] Appl. No.: 482,490

[30] Foreign Application Priority Data

| | | |
|---|---|---|
| July 17, 1973 | United Kingdom | 34054/73 |
| Nov. 7, 1973 | United Kingdom | 51742/73 |

[52] U.S. Cl. .......... 219/76; 219/73
[51] Int. Cl.² .......... B23K 25/00
[58] Field of Search .......... 219/73 A, 73 R, 76

[56] References Cited

UNITED STATES PATENTS

| | | | |
|---|---|---|---|
| 3,337,712 | 8/1967 | Lucey | 219/73 |
| 3,352,993 | 11/1967 | Suzuki et al. | 219/73 |
| 3,646,312 | 2/1972 | Cable et al. | 219/73 |
| 3,755,647 | 8/1973 | Pierart | 219/73 |

FOREIGN PATENTS OR APPLICATIONS

| | | | |
|---|---|---|---|
| 886,174 | 11/1971 | Canada | 219/73 |

*Primary Examiner*—J. V. Truhe
*Assistant Examiner*—N. D. Herkamp
*Attorney, Agent, or Firm*—Karl W. Flocks

[57] ABSTRACT

A method of producing from straight metal section material fork lift truck forks of substantially L-shaped construction with substantially vertical and horizontal arm portions extending from the bend, comprising heating the straight metal to softening point in the region of the proposed bend and while the vertical and horizontal arm portions are supported substantially at right angles, forming with softened metal by cavity welding the required shape of the fork in the region of the bend.

11 Claims, 14 Drawing Figures

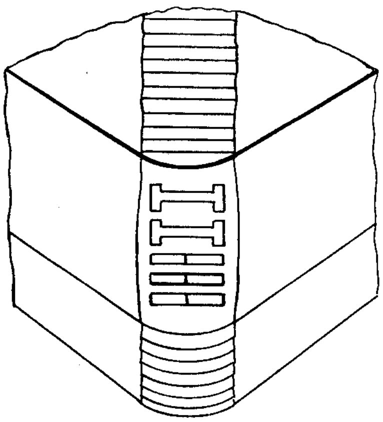
FIG. 8.
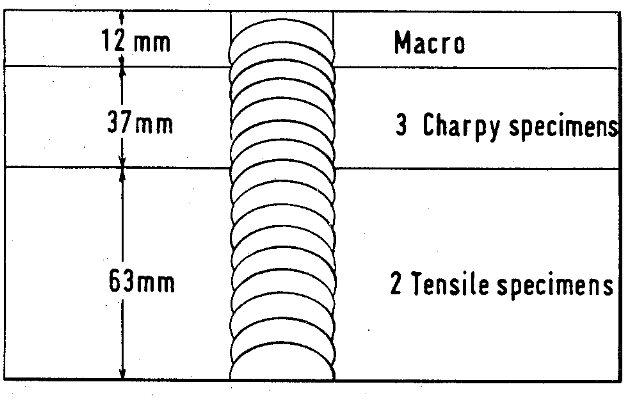
FIG. 9.
FIG. 10.
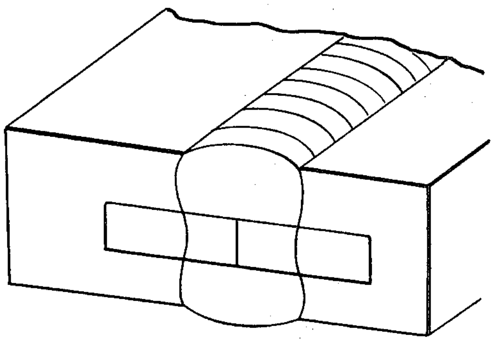
Charpy impact specimens notch normal to surface at centre line of weld.
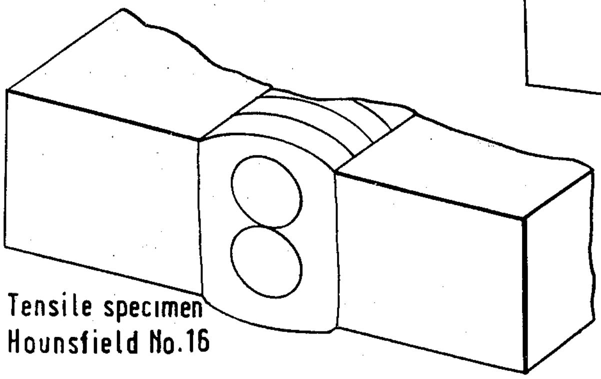
FIG. 11.

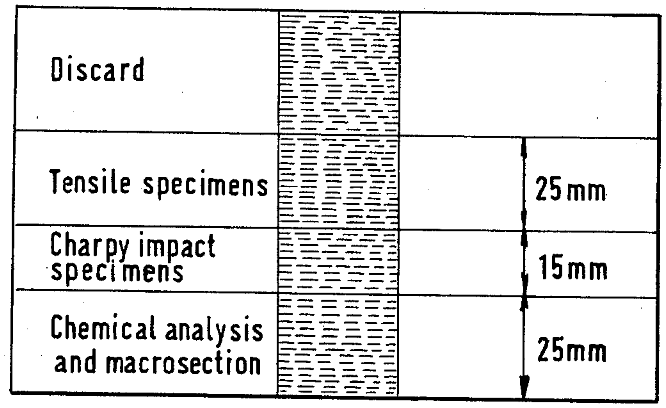
FIG.12.
FIG.13.
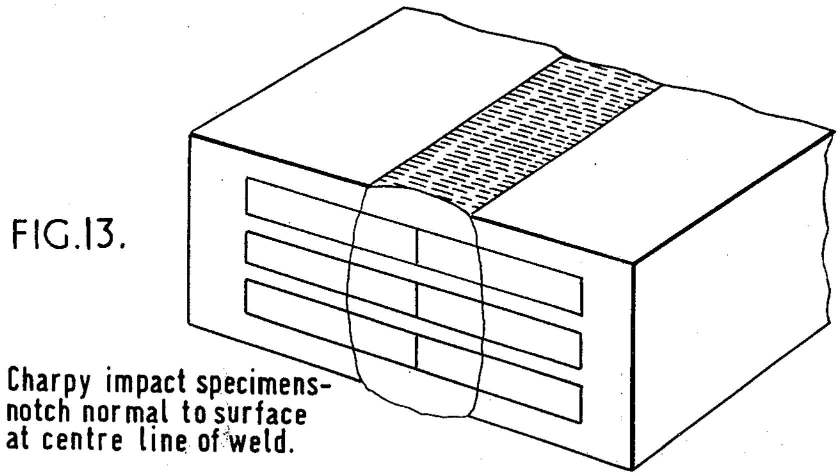
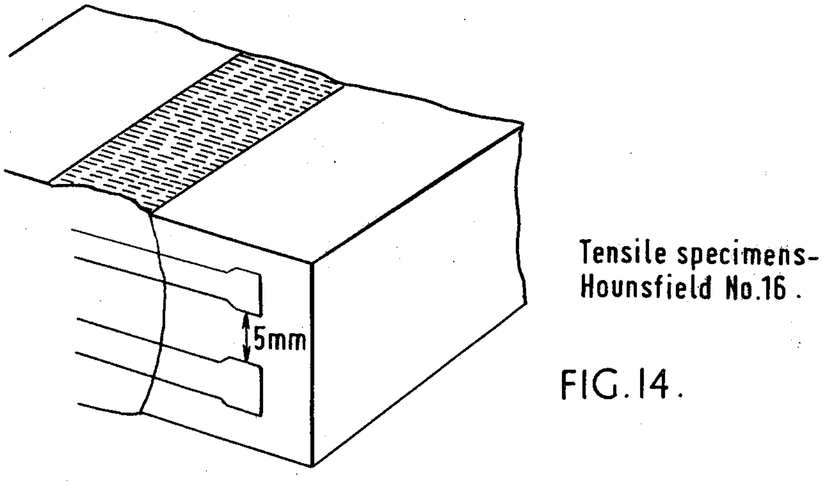
FIG.14.

MANUFACTURE OF FORKS FOR FORK LIFT TRUCKS

BACKGROUND OF THE INVENTION

1. Field of the Invention

This invention relates to the manufacture of forks, for use in fork lift trucks, and of like members from rolled steel sections.

Forks for fork lift trucks comprise two large and very strong arms disposed substantially at right angles to one another, one arm having a tapered end portion for engagement under massive loads to be lifted and the other arm having a hook for engagement over a support member on the fork carriage riding on the mast of a fork lift truck. The bends of such forks are normally subjected to an immense bending moment during use.

2. Description of Prior Art

Such forks have hitherto been made from rolled steel solid sections or strip. The taper is formed on one end portion of section or strip as by forging and then the section or strip is bent about its mid portion by conventional bending methods. This bending is normally effected by drop forging and then the forks thus formed are subjected to heat treatment for example at the angle to the degree of hardness desired. Such methods have the disadvantage that they take a long time and require the expertise of forgemasters which results in a high cost of production. Also the crystalline structure of the section or strip tends to change during the bending and thus does not have the optimum crystalline condition.

It has been proposed to butt weld two arm sections together at right angles but this necessitates disposing the arm ends at right angles with one shaped arm end almost abutting the side of the second arm with a small gap e.g. 2 mm between them. The shaped end of the first arm has cutaway portions and these cutaway portions form, with the second arm, cavities into which weld metal is welded. This method is slow and the free end of the second arm adjacent the weld has to be ground or otherwise mechanically shaped to form a satisfactory smooth surface at the outside angle of the bend formed at the welded joint while the inside angle must be rounded with weld metal. This has proved to be expensive and time consuming and the necessary crystalline condition of the metal at the bend may have to be provided by heat treatment.

The main object of the present invention is to provide an improved process for the production of such forks in which the aforesaid disadvantages are reduced to an acceptable minimum.

SUMMARY

According to the present invention a method of producing from straight metal section fork lift truck forks of substantially L-shaped construction with substantially vertical and horizontal arm portions extending from the bend, comprises heating the straight metal to softening point in the region of the proposed bend and while the vertical and horizontal arm portions are supported substantially at right angles, forming with softened metal the required shape of the fork in the region of the bend.

In a preferred method the invention comprises providing from a rolled steel strip having the cross section of the desired fork two arm portions, disposing the ends of the two arm portions in contiguous mutually substantially perpendicular relationship with an air gap between them, masking the gap to form an enclosed cavity, introducing into the cavity one or more tubular guides of weldable material, passing a wire of weldable material through each guide into the cavity, passing a high frequency electric current through the weldable material of each wire and/or guide to soften the weldable material so that it flows to fill the cavity and softens the adjacent arm ends to form a solid metal union of the arms with the weldable material shaped by the masking to form the bend between the two arms. The adjacent ends of the two arms are preferably mitred to provide a parallel sided gap between them.

BRIEF DESCRIPTION OF THE DRAWINGS

FIG. 8 shows how test specimens are taken from the weld of FIGS. 4 and 5 where the metal is EN24 steel FIGS. 9, 10 and 11 show how test specimens respectively for Macro, Charpy and Hounsfield No. 16 are taken from the weld of FIGS. 4 and 5 where the metal is Superelso 70;

FIG. 12 is a plan view showing how test specimens are taken from the weld metal of the weld in FIG. 11; and, FIGS. 13 and 14 are perspective views showing how test specimens are taken.

In the drawings, the same references are used to designate the same or similar parts.

DESCRIPTION OF PREFERRED EMBODIMENTS

Figure 1:
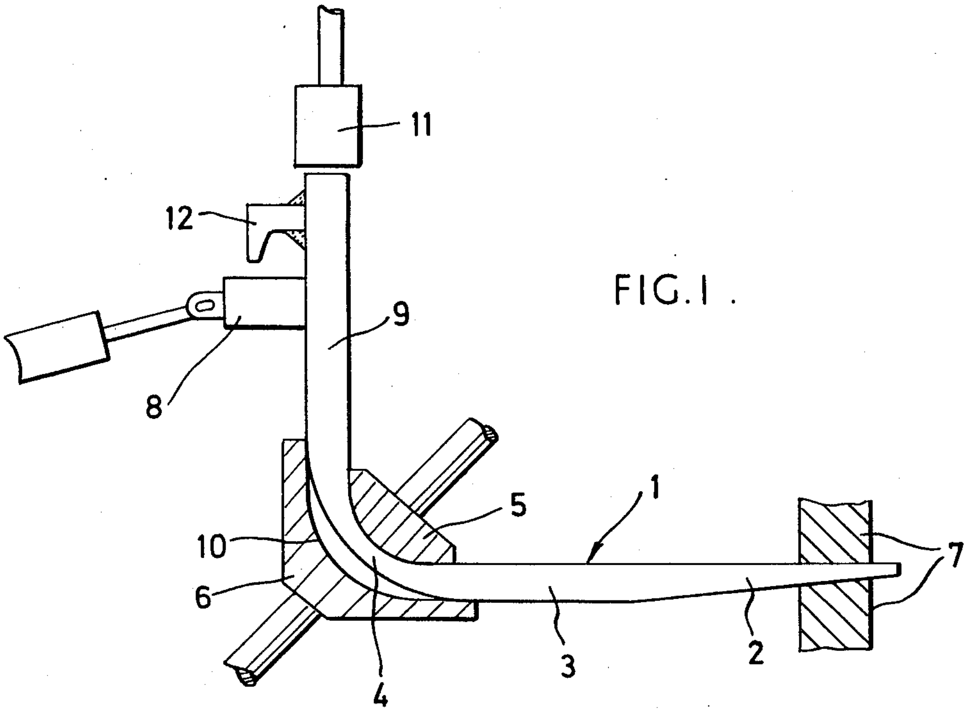
FIG. 1 shows one method of making form arms for fork lift trucks.

Referring to FIG. 1 the fork being formed from a strip of rolled steel of the cross section of the desired fork is shown at 1 at the end of the bending operation. Prior to the bending operation the end portion 2 of the arm 3 of the fork is tapered to assist in its penetration beneath a load in use, and this tapering is formed by any conventional means as by drop forging. After the tapering operation, the portion 4 where the bend is to be formed is heated to softening point by any suitable means; preferably it is disposed within an induction coil and heated desirably to a higher temperature than is required for bending but such that as it is transferred to the bending apparatus, its loss of heat will not reduce its temperature to below that required for the bending operation. It may however be heated in the bending apparatus as by moving heaters into position to heat it and withdrawing the heaters before bending, or the bending tools may incorporate the heaters.

The strip is then transferred to the bending apparatus or in the said alternative arrangements the heaters are removed and/or de-energized. The essential parts of the bending apparatus are indicated diagrammatically in FIG. 1, namely an inner angle forming tool and an outer forming tool 6 having surfaces in contact with the strip but with contours required at the bend in the final forks. During the bending the arm 3 of the fork is clamped in suitable means indicated at 7. A force-applying member 8 such as an hydraulic ram is forced against the other strip arm 9 causing the strip to bend about the tool 5 until it is approximately at 90° to the arm 3, the tool 6 following the strip and coming into contact with the arms on either side of the bend. During this bending operation the strip will be reduced in thickness leaving at the bend a gap 10 between the metal of the strip and the face of the tool 6.

While the metal of the bent portion is still at a deformable temperature, a force-applying device shown as a ram 11 is applied to the end of the arm 9 in an axial direction thereof causing the soft metal at the bend to be upset so that it fills the cavity 10 thus providing the bend with the thickness required. If desired the metal at least at the bend may be further heat treated to impart to it the desired degree of hardness, e.g. to a hardness of Q or T, and crystalline condition.

Finally the lug 12 is welded or otherwise secured to the free end portion of the arm 9 for hooking the fork on the fork carriage lift truck mast (not shown). Or a bore may be provided in the arm 9 through which damping means such as bolts may be passed.

Figure 2:
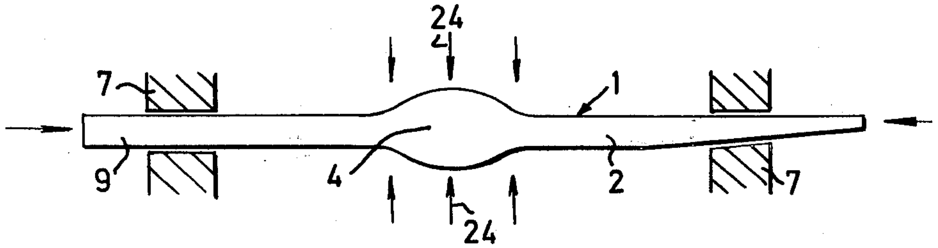
FIG. 2 is a view of a rolled steel strip showing how the metal of a strip is upset.
Figure 3:
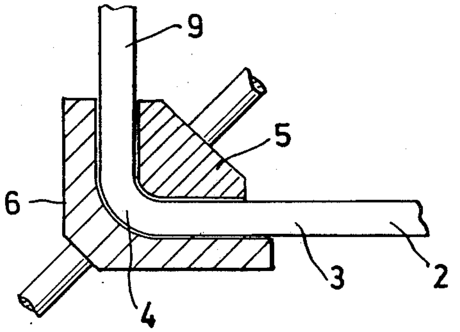
FIG. 3 is a view similar to FIG. 1 showing the formation of the bend.

Referring to FIGS. 2 and 3, these show an alternative embodiment in which the strip 1 is heat treated, by suitable means such as electrical induction means indicated by arrows 24, to softening point in the region of the intended bend 4 in the resultant forks. The ends of the arms 2, 9 are supported in members which prevent movement in a direction normal to the strip. Force applying means such as an hydraulic ram is forced against both ends of the strip, or one portion may be clamped as by a member 7 and pressure is applied to the other portion, the pressure always being in the direction of the longitudinal axis of the strip. Since the strip at the region 4 is softened it will be shortened in length forming a bulge as seen in FIG. 2, in the region 4. The degree of formation is to provide enough metal in the bulge for the purpose to be described. The bulge is heated to a temperature in excess of that required for the bending operation to be described so that after transferring the strip to the bending apparatus the metal is still soft enough to effect the bending.

The strip is then transferred to a bending apparatus similar to that described with reference to FIG. 1. The bending of the strip is carried out as described with reference to FIG. 1 with the difference that the ram 8 only ensures no longitudinal movement of the arm 9 unless the metal in the region 4 does not on bending completely fill the cavity between the tools 5 and 6.

During the bending operation the softened metal in the bulge will fill the cavity between the tools 5 and 6. If surplus softened metal is present it will spill out of the sides of the tools 5 and 6 and can be subsequently removed by mechanical action such as grinding. If the softened metal does not fill the cavity the ram 11 can be actuated to move the arm 9 longitudinally towards the tools 5, 6 so that the cavity is filled.

Figure 4:
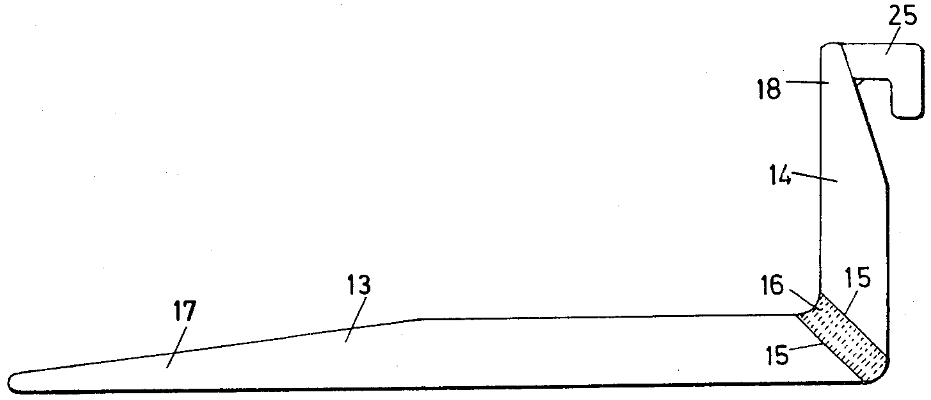
FIG. 4 shows another form of weld by which metal strips are united to form a fork.

Referring to FIG. 4 this shows a fork made from two metal strips 13, 14 e.g. of EN 24 steel having mitred ends 15 joined by a weld 16, the strips having tapered ends 17, 18 respectively, that on strip 13 being to assist the insertion of the arm of the fork beneath a load and that on the strip 14 shaping it for connection to the fork carriage of a fork lift truck mast. The tapers or shaping may be formed by any suitable means such as forging.

Figure 5:
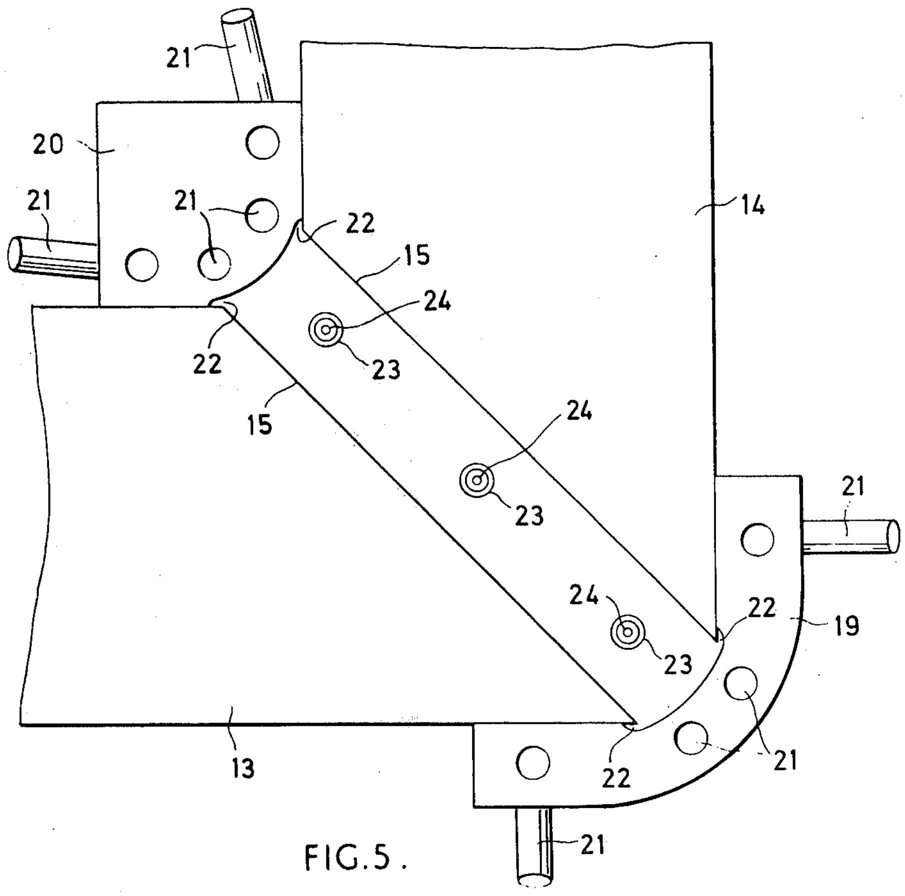
FIG. 5 is an enlarged diagram of the weld of FIG. 4 showing how it is formed.
Figure 6:
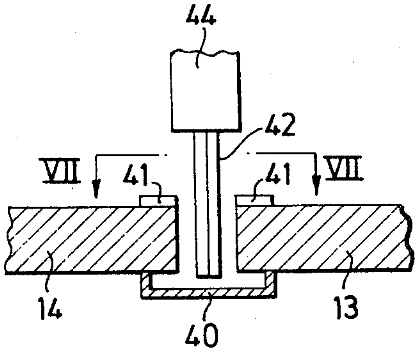
FIG. 6 shows how the welding is carried out in the formation of the weld in FIG. 5.
Figure 7:
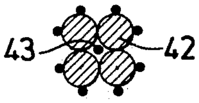
FIG. 7 is a cross section along the line VII—VII of FIG. 6 looking in the direction of the arrows and drawn to a large scale.

FIGS. 5 to 7 show the manner of forming the weld 16 in FIG. 4. The two strips 13, 14 are fixed in clamps (not shown, of known construction) with their mitred ends 15 substantially parallel so that the strips are at approximately 90°. A hollow jacket 19 is clamped with respect to the strips by suitable means (not shown) to mask the end of the gap on the outer angle and a second hollow jacket 20 is clamped in the inner angle masking the inner end of the gap. The bottom of the gap is closed by an electrically conducting plate 40 (FIG. 6) secured in position, the top of the strips 13, 14 having blocks 41 secured thereto leaving a gap between them through which the welding apparatus to be described may be inserted. The jackets 19, 20 are cooled by a cooling fluid such as cold water in ducts 21 communicating with the hollow jacket interiors. The jackets 19 and 20 are preferably made of laminated copper and have overlap spaces 22 for the weld flash. The strips 13 and 14 are then welded together at the gap in any suitable manner.

The welding may be carried out by inserting one or more tubular guides 23 (three being shown in FIG. 5) of weldable material through the apertures into the gap through the top plate, three guides 23 being shown by way of example, and the ends of wires 24 of weldable material and passed through the guides. A suitable material for the guides 23 and wires 24 is EN 24 steel.

An example of the welding operation is shown in FIGS. 6 and 7 in which the welding metal in the form of a guide and a welding wire are employed. The guide comprises a number of rods 42 nested together to form a channel between them through which a welding wire 43 is passed. The rods and wire are held in a welding head 44 which is lowered as the lower ends of the rods and wire soften or melt and fill the cavity above the plate 40.

The composition of the metal of the rods and wire is chosen according to the number of rods, the width of the gap between the strips 13, 14 and the dilution effect of the welding metal itself. It has been found that suitable welds are obtained where the metal of the weld contains approximately 0.17 percent C, 0.2 percent Si, 1.0 percent Mn, 2.5 percent Ni, 1.8 percent Cr and 0.6 percent Mo the remainder being Fe. The Nickel is preferably introduced by making the rods of steel and applying by tacking on one or more strips of nickel to one or more of the rods. The amount of nickel the number and dimensions of the rods and wire for each weld are found by a pretrial and can be deduced by the expert welder carrying out the welding operation. What the operator achieves is the aforesaid content of the weld metal in the final weld and he controls the welding operation to obtain in the metal of the weld a substantially homogeneous metal having the aforesaid composition.

An electric welding current is applied to the welding devices to cause the wires to soften or melt while the wires are fed through the guide rods to supply the welding material into the gap, the heat generated by the electric current also softening or melting the rods and the contiguous mitred end portions of the strips 13, 14. This process is continued until the gap is completely filled overflowing into the spaces 22. The welding in one embodiment was carried out at 650 amps 250 volts for about 45 minutes, where the strips 13, 14 were 4 × 3 inch sections.

When the welding is complete the whole is allowed to cool and then the jackets and top and bottom plates are dismantled having acted with the mitred ends 15 as a mould for the welding material. The flashes of the weld on the inner and outer angles of the bend thus formed and if necessary on the top and bottom of the weld are removed by any suitable means such as by grinding or milling, in any known manner and the whole fork may be surface finished in any suitable manner.

If desired lugs 25 may be fixed as by welding to the arm 14 for connecting to the mast carriage of a fork lift truck. The whole fork or the bend may be heat treated to give it the desired degree of hardness, such as Q and T, and a crystalline structure.

This welding operation will now be further described with reference to the following Examples.

EXAMPLES 1 and 2

Two forks were formed by the above welding process from strips of forged EN 24 steel using two differing welding metals EN 24 and EN/24/2.

Each fork had a 127 × 304 mm steel having the following percentage composition by weight:

| | | | |
|---|---|---|---|
| C | 0.40 | Cr | 1.11 |
| Si | 0.26 | Mo | 0.23 |
| Mn | 0.59 | S | 0.005 |
| Ni | 1.39 | P | 0.011 |
| Remainder being Fe. | | | |

Two consumable guide electroslag corner welds wre made in EN24 steel. The steel sections were positioned with the 304 mm dimension in the vertical plane and the welds were made through the 127 mm thickness. A gap of 32 mm was set and both welds were made using three 3.2 mm SD3 2½Cr 1Mo wires supplied by the British Oxygen Company and Rowen Arc AN8 flux for the first weld and Esab 10.50 flux for the second. The joints were made with three guides each produced from four 10 mm diameter round black steel (2 percent Mn) rods tack welded together. Nickel was added to the weld deposit in the first weld by tacking eight 4 mm diameter nickel strips or rods to one or more of the guide rods, and, in the second by depositing nickel from five 4 mm nickel electrodes onto each guide.

Run-on and run-off blocks cut from the EN24 forging were attached .to the joints making the total weld length approximately 400 mm. The welds were both made with a DC power supply the first at 1600 A and 43V and the second at 1300 A and 33 V. The welding time for the first weld was approximately 40 minutes and for the second 60 minutes.

The heat treatment used on these samples was as follows:

| | | |
|---|---|---|
| EN24 | Normalising | 820–850° C/2 hours - Air cool |
| | Normalising and | 820–850° C/2 hours - Air cool |
| | temper | 650° C/3 hours - Air cool |
| | Quench and | 820–850° C/2 hours - Oil quench |
| | temper | 650° C/3 hours - Air cool |

The weld metal was analyzed by direct reading spectrography and the composition is shown in Table 4.

Table 4

| Weld Metal | C | S | P | Si | Mn | Ni | Cr | Mo | Cu |
|---|---|---|---|---|---|---|---|---|---|
| EN24/1 | 0.29 | 0.009 | 0.017 | 0.21 | 0.85 | 3.67 | 1.70 | 0.52 | 0.13 |
| EN24/2 | 0.30 | 0.007 | 0.017 | 0.20 | 0.85 | 2.68 | 1.60 | 0.46 | 0.13 |

In the first sample EN24/1 intermittent cracks were visible in the weld metal on the centre line at each side of the joint and a macro-section showed the cracks extending a quarter to a third of the way through the joint.

On the other hand the second sample EN24/2 exhibited no cracks and the macro-section revealed no internal defects in the weld.

Both samples were quenched and tempered after heat treatment and subsequent examination revealed a quench crack at the centre of the concave edge of the joint which extended one third of the way through the joint.

The second sample EN24/2 was sectioned into four pieces, the top piece being used for macro and chemical analysis and the remaining three pieces being used for mechanical testing in the as-deposited, normalized and quench and tempered conditions.

A piece of the normalised section was subsequently tempered for 3 hours at 650° C and tested. Two hounsfield No. 16 tensile and three Charpy impact specimens were machined from each piece according to the sectioning procedure shown in FIG. 9. The tensile tests were carried out at room temperature and the charpy impact specimens were tested at 0° C. The results are given in Table 1.

Table 1

| | | Mechanical Test Results | | | | | | |
|---|---|---|---|---|---|---|---|---|
| | | Yield Strength | | UTS | | | | |
| Specimen | Heat Treatment | N/mm² | Tonf/in² | N/mm² | Tonf/in² | Elongation % | R of A % | Charpy impact values (° C) J |
| EN 24 | As-deposited | 576 | 37.3 | 838 | 54.3 | 2 | 2 | 8, 11, 12 |
| | | 904 | 58.5 | 904 | 58.5 | 2 | 2 | |
| | Normalised | 965 | 62.5 | 1217 | 78.8 | 4 | 8 | 18, 20, 22 |
| | | 985 | 63.8 | 1118 | 72.4 | 3 | 5 | |
| | Normalised | 653 | 42.3 | 835 | 54.1 | 23 | 59 | 46, 48, 43 |
| | and Tempered | 650 | 42.1 | 833 | 53.9 | 24 | 60 | |
| | Quench and | 743 | 48.1 | 864 | 55.9 | 20 | 53 | 69, 88, 81 |
| | Tempered | 748 | 48.4 | 873 | 56.5 | 21 | 59 | |
| Superelso 70 | As-deposited | 914 | 59.2 | 1066 | 69.0 | 5 | 10 | 35, 34, 35 |
| | | 896 | 58.0 | 1092 | 70.7 | 9 | 12 | |
| | Normalised | 840 | 54.4 | 1060 | 68.6 | 13 | 32 | 14, 16, 14 |
| | | 817 | 52.9 | 1057 | 68,4 | 14 | 26 | |
| | Quench and | 797 | 51.6 | 890 | 57.6 | 19 | 46 | 29, 38, 41 |

Table 1-continued

| | | Mechanical Test Results | | | | | | |
|---|---|---|---|---|---|---|---|---|
| | Heat | Yield Strength | | UTS | | Elongation | R of A | Charpy impact values (° C) |
| Specimen | Treatment | N/mm² | Tonf/in² | N/mm² | Tonf/in² | % | % | J |
| | Tempered | 774 | 50.1 | 879 | 56.9 | 20 | 58 | |

The tests showed that a UTS of 830 N/mm² (53.5 tonf/in²) and a Charpy impact level exceeding 40 J at 0° C can be achieved in consumable guide electroslag weld deposits in 127 × 304 mm section EN24 steel in either the normalised and tempered or the quench and tempered conditions.

If the tests showed that the normalised and tempered joints were liable to cracks further treatment was necessary. It is known that the steel must remain ferritic since transformation to austenite, the hydrogen level of which does not decrease because hydrogen does not readily diffuse out of austenite, results in hydrogen remaining which is detrimental. Thus the steel was heated to as high a temperature as possible before quenching; this treatment at about 650° C for 5 hours was carried out and then the sample was transferred to an austenising furnace operating at 820°–840° C at the completion of which the sample was oil quenched. It was found advantageous if the inner and outer edges of the weld were ground smooth to eliminate surface irregularities which could act as crack initiators.

To achieve the best impact values at the specified strength level the composition of the weld deposit was designed to lie as close as possible to the analysis: 1 percent Mn, 2.5 percent Ni, 1.6 percent Cr, 0.5 percent Mo. Carbon increases the risk of solidification cracking and for this reason was to be kept as low as possible. However, it could not be kept particularly low because of dilution from the plate and in both EN24 welds was approximately 0.30 percent. This arose because the dilution (proportion of base material melted into weld metal expressed as a percentage) was in the region of 50–60 percent this level being necessary to ensure adequate fusion along the length of the joint with the equipment used. This equipment has a common terminal for the three guides and control of penetration could not be achieved simply by altering the current level of each guide. With separate guides having independent current and voltage inputs, fusion of the base material is more readily controlled and the dilution should be reduced to about 40 percent.

Experiments showed that during the welding Cr and Mo if added to the wire fed through the guides 23 together with nickel, provided a satisfactory weld deposit in the gap. Suitable wire and guide materials were found to be:

a. 2¼Cr-1Mo wire or 1¼Cr-½Mo wire depending on joint preparation and dilution with a C-Mn steel guide to which nickel rods are attached to give the correct deposit composition.

b. Cored wire containing Ni, Cr and Mo alloy additions in the core and a standard C-Mn steel guide.

c. Standard C-Mn steel wire with a flux coated C-Mn steel guide in which the alloy additions are included in the flux coating.

It was observed that the choice of consumables in the welding must be selected such that they do not themselves give rise to problems. If a flux were used to coat the guides it must be one which will not become broken and must contain sufficient alloying additions to the deposit during welding.

The results showed that where the Ni content of the weld metal exceeded 3.5 percent by weight cracks could form in the weld, which did not happen with a Ni content of 2.7 percent or lower.

EXAMPLE 3

The procedure of Examples 1 and 2 was followed using for the strips 13, 14 Superelso 70 in the form of a rolled plate 32 thick with the following composition:

| | |
|---|---|
| C 0.18 | Mo 0.23 |
| Si 0.38 | S 0.015 |
| Mn 1.39 | P 0.010 |
| Ni 0.83 | Cn 0.48 |
| Cr 0.73 | |

The consumable nozzle weld of the Superelso 70 steel was made between two plates measuring 304 × 608 × 32 mm along the 608 mm dimension with a 32 mm gap. One guide was used being made from two 10 mm diameter round black steel rods and two 10 mm diameter thin walled tubes filled with 2.4 mm Ni 61 wire. Run-on blocks were attached to the joint and the weld was made at 500 A and 38 V with a DC power supply, the welding time being approximately 20 minutes. 3.2 mm SD2 1¼Cr ½Mo wire supplied by Oerlikon Electrodes Ltd. and Rowen Arc AN8 flux were used.

The heat treatment was as follows:

| | |
|---|---|
| Normalising | 900° C/1¼ hours - Air cool |
| Quench and | 900° C/1¼ hours - Water quench |
| Temper | 600° C/1 hour - Air cool |

The analysis of the resultant welds is shown in Table 1 above.

Transverse macro - sections of the Superelso 70 weld in the as-deposited, normalised and stress relieved conditions showed that cracks developed in the as-deposited sample which increased during heat treatment followed by quenching and tempering.

It was found that by keeping the Ni content in the weld metal below 3.5 percent by weight the defects including cracking were eliminated or at least reduced to acceptable levels.

In the tests elongation and reduction of area were similar to the EN 24 weld, but the Charpy impact values were only half the values achieved in the EN24 weld.

In these Examples it was apparent that in an EN24 steel consumable guide electroslag weld deposit, 127 × 304 mm in cross section, containing approximately 0.30 percent C, 0.2 percent Si, 0.85 percent Mn, 2.7 percent Ni, 1.6 percent Cr and 0.5 percent Mo, a UTS exceeding 830 N/mm² (53.5 tonf/in²) and an average Charpy impact level exceeding 40J at 0° C can be achieved with one of the following heat treatments:

| | | |
|---|---|---|
| a) Normalising and tempering | 820–850° C/2 | hour - air cool |
| | 650° C/3 | hour - air cool |
| b) Quenching and tempering | 820–850° C/2 | hour - oil quench |
| | 650° C/3 | hour - air cool. |

Control of weld metal composition, in particular nickel, is necessary to minimise solidification cracking and it is preferable that the nickel content should not exceed 2.7 percent.

Mechanical tests of consumable guide welds in 32 mm thick Superelso 70 steel have demonstrated that the UTS, after a quench and temper heat treatment, exceeds 830 N/mm$^2$ (53.5 tonf/in$^2$) and that Charpy impact values in the range 29-41J at 0° C can be obtained.

EXAMPLE 4

This Example was carried out as in FIGS. 5 to 7 in which the strip was first cut into two portions in the region of its mid length and of these two portions one 13 was tapered as by drop forging as in FIGS. 4 and 5. The welding was carried out as described with reference to FIGS. 5 to 7.

After the welding was completed the whole was allowed to cool and then the jackets and plate 40 with the welding means were dismantled, the jackets and plate having acted as a mould for the welding material. The surfaces of the welded metal could be finished to shape if desired by any suitable tools as by grinding. Finally lugs 12 as in FIG. 1 or bores were secured to the free end portion of the arm 14. If desired the whole fork or the welded bend may be further heat treated to give it the desired degree of hardness, such as Q or T and crystalline structure.

The samples of 51 × 200 mm section forged EN24 steel in the T-condition. This material was analysed by direct reading and had the following composition (wt%):

| C | Si | Mn | Ni | Cr | Mo | S | P |
|---|---|---|---|---|---|---|---|
| 1.42 | 0.35 | 0.6 | 1.4 | 0.95 | 0.15 | 0.005 | 0.02 |

Similar section C-Mn steel to BS4360 Grade 43C was also used.

Two consumable guide electroslag welds were made, one in EN24 steel and the other between EN 24 and C-Mn steel. The steel sections were positioned with the 200 mm dimension in the vertical plane and the welds were made through the 51 mm thickness. A gap of 32 mm was set at the bottom of the joint and this was increased to 37 mm at the top. Both welds were made using 3.2 mm. Carbowire SD2 2½Cr 1Mo supplied by Oerlikon Electrodes Ltd. and Esab 10.50 flux. The guide for the EN 24 to mild steel weld was made from four 10 mm diameter round bright steel rods tack welded together. In the case of the EN 24 to EN 24 weld, the same basic guide was used but it had in addition, a number of Nickel 61 402 wires attached to the outside these being held in place by a mild steel sheath or by tack welding.

Run on and run off blocks were attached to the joints and the total weld lengths were approximately 250 mm. The welds were made at 500 amps and 38 volts with a DC power supply, the welding time in each case being approximately 20 minutes.

The heat treatment conditions to achieve the T-condition for EN24 steel were as defined in BS 970 : 1955 as follows:

Harden in oil from a temperature of 820°–850° C.

Temper at a suitable temperature not exceeding 660° C.

To establish the detailed heat treatment conditions to give the T-condition 50 × 50 mm blocks were quenched in oil following 1 hour at 820° – 840° C. and then tempered as follows:

1, 2 and 3 hours at 500° C.

1, 2 and 3 hours at 600° C.

Following heat treatment, the blocks were sectioned in two and Vickers Hardness measurements obtained from the central region.

The results obtained are given in Table 3. The target hardness for the T-condition was within the range 250–300 Hv and on the basis of these results these specimens to be tested were tempered in the heat treated condition for 3 hours at 650° C following the quenching treatment.

The welds were analysed by direct reading spectography and the compositions are given in Table 4.

On completion of welding, the reinforcement was ground flush and the welds were radiographed (X-radiation). No defects were detected. Transverse sections were polished, etched and photographed.

Each weld was cut in half for mechanical testing, one half to be tested in the as-deposited condition and the other half following heat treatment to the T-condition. Two Hounsfield No. 16 tensile and three Charpy impact specimens were removed according to the sectioning procedure shown in FIGS. 12–14. The tensile tests were carried out at room temperature and the Charpy impact specimens tested at 0° C. The results are given in Table 5. In addition tensile and Charpy impact tests were carried out on the EN 24 parent material in the as-received condition and following heat treatment. The results of these tests are also given in Table 5.

Radiographs have shown that sound welds can be made by the consumable guide electroslag process in EN 24 steel welded to itself or mild steel. In a weld deposit containing approximately 0.17 percent C., 0.2 percent Si, 1.0 percent Mn, 2.5 percent Ni, 1.8 percent Cr and 0.6 percent Mo between EN 24 steel the UTS after heat treatment to the T-condition exceeded 850 N/mm$^2$ (55 tonf/in$^2$) and the Charpy impact properties were similar to the EN 24 in the T-condition.

Table 3

| | Vickers Hardness results of heat treated blocks $HV_{10}$ | | | | | |
|---|---|---|---|---|---|---|
| Indentation | 1hr/500° C | 2hr/500° C | 3hr/500° C | 1hr/600° C | 2hr/600° C | 3hr/600° C |
| 1 | 429 | 429 | 387 | 390 | 354 | 330 |
| 2 | 433 | 429 | 429 | 383 | 346 | 342 |
| 3 | 429 | 420 | 409 | 380 | 360 | 339 |
| 4 | 441 | 429 | 420 | 370 | 354 | 345 |

Table 3-continued

| | Vickers Hardness results of heat treated blocks $HV_{10}$ | | | | | |
|---|---|---|---|---|---|---|
| Indentation | 1hr/500° C | 2hr/500° C | 3hr/500° C | 1hr/600° C | 2hr/600° C | 3hr/600° C |
| 5 | 446 | 454 | 417 | 376 | 336 | 333 |
| 6 | 429 | 450 | 413 | 376 | 354 | 333 |

*All specimens oil quenched from 1hr/820–840° C

Table 4

| | Weld Metal Analysis (wt %) | | | | | | | | |
|---|---|---|---|---|---|---|---|---|---|
| Weld | C | S | P | Si | Mn | Ni | Cr | Mo | Cu |
| EN24/M.S. | 0.19 | 0.012 | 0.015 | 0.15 | 1.03 | 0.59 | 1.66 | 0.58 | 0.22 |
| EN24/EN24 | 0.17 | 0.014 | 0.016 | 0.19 | 1.05 | 2.50 | 1.86 | 0.65 | 0.24 |

Table 5

| | | Mechanical test results | | | | | | |
|---|---|---|---|---|---|---|---|---|
| | Heat Treatment | Yield Strength | | UTS | | Elong | | Charpy impact |
| Specimen | condition | $N/mm^2$ | $Tonf/in^2$ | $N/mm^2$ | $Tonf/in^2$ | % | R of A % | value ° C (J) |
| EN24 Steel | As-Received | 834 | 54.0 | 958 | 62.0 | 20 | 50 | 40, 42, 42 |
| | | 830 | 53.7 | 959 | 62.0 | 19 | 49 | |
| | 1hr/820–840° C | 858 | 55.6 | 962 | 62.3 | 20 | 50 | 43, 42, 45 |
| | 3hr/650° C | 857 | 55.5 | 963 | 62.4 | 21 | 52 | |
| EN24-EN24 | As deposited | 955 | 61.8 | 1210 | 78.3 | 9 | 7 | 23, 22, 24 |
| weld | | 991 | 64.2 | 1217 | 78.8 | 7 | 9 | |
| | 1hr/820–840° C | 752 | 48.7 | 873 | 56.5 | 25 | 67 | 33, 49, 36 |
| | 3hr/650° C | 755 | 48.9 | 872 | 56.5 | 20 | 58 | |
| EN24-M.S. | As-deposited | 789 | 51.1 | 1017 | 65.9 | 13 | 12 | 14, 12, 10 |
| weld | | 826 | 53.5 | 1032 | 67.9 | 10 | 11 | |
| | 1hr/820–840° C | 675 | 43.7 | 771 | 49.9 | 21 | 62 | 18, 10, 11 |
| | 3hr/650° C | 670 | 43.4 | 763 | 49.4 | 19 | 63 | |

By the method of the invention the crystalline condition of the metal at the bend is satisfactory but heat treatment or other treatment may be applied to modify the characteristics of the metal of the bend, if desired, for any purpose including minimising the incidence of cracks in the weld.

By the method of the invention the forks can be fabricated by inexperienced operatives in the space of a short time compared with the time taken in the known methods.

I claim:

1. A method for producing from straight metal section material fork lift truck forks of substantially L-shaped construction having large and very strong substantially horizontal and vertical arm portions for lifting massive loads, comprising providing from a rolled steel strip having a substantial sized cross section of the desired fork two arm portions, disposing the ends of said arm portions in contiguous substantially perpendicular relationship with an air gap between them, masking said gap to form an enclosed cavity, introducing into said cavity at least one tubular guide of welding material and passing a wire of welding material through said guide into said cavity, passing a high frequency electric current through said welding material of at least one of said guide and said wire to soften said welding material so that it flows to fill said cavity and softens said contiguous ends of said arms to form a solid and very strong union between said arms with welding material shaped by said masking to form said union between said arms, and thereafter normalizing and tempering the metal of the formed fork.

2. A method according to claim 1 wherein said strip material is of EN 24 steel having substantially the following percentage composition by weight C, 0.40; Si, 0.26; Mn, 0.29; Ni, 1.39; Cr, 1.11; Mo, 0.23; S, 0.005 and P, 0.011, the remainder being Fe.

3. A method according to claim 1 wherein said strips are of 127 × 304 mm steel with mitred ends and said strips are supported with said gap between said mitred ends being 32 mm wide.

4. A method according to claim 1 wherein said wire is of 3.2 mm SD3 2½Cr 1 Mo metal used with a flux selected from Rowen Arc AN8 and Esab 10.50.

5. A method according to claim 1 wherein the Ni content in said welding material is not in excess of 2.7 percent by weight.

6. A method according to claim 1 wherein the heat treatment is

| | | |
|---|---|---|
| EN 24 | | |
| | Normalising | 820–850° C/2 hours - Air cool |
| | Normalising and temper | 820–850° C/2 hours - Air cool<br>650° C/3 hours - Air cool |
| | Quench and temper | 820–850° C/2 hours - Oil quench<br>650° C/3 hours - Air cool. |

7. A method according to claim 1 wherein said strips are of Superelso 70 steel having a composition of percentage by weight of C, 0.18; Si, 0.38; Mn, 1.39; Ni, 0.83; Cr, 0.73; Mo, 0.23; S, 0.015; P, 0.010; Cn, 0.48, the remainder being Fe, said strips being of 304 × 608 × 32 mm section separated by said gap which is 32 mm wide.

8. A method according to claim 1 wherein the heat treatments used are

| | | |
|---|---|---|
| Normalising | 900° C/1¼ hours - Air cool | |
| Quench and | 900° C/1¼ hours - Water quench | |
| temper | 600° C/1 hour - Air cool. | |

9. A method according to claim 1 wherein said union being formed is percentage by weight substantially Mn, 1.0; Ni, 2.5; Cr, 1.6; Mo, 0.5, and the remainder being Fe.

10. A method in accordance with claim 1 wherein said union being formed comprises not more than about 0.30 percent by weight carbon, not more than about 2.7 percent by weight nickel, about 0.2 percent by weight silicon, about 0.85 percent to 1.0 percent by weight manganese, about 1.6 percent to 1.8 percent chromium, about 0.5 percent to 0.6 percent by weight molybdenum, the remainder being iron.

11. A process in accordance with claim 1 further comprising quenching said fork after normalizing and tempering.

* * * * *